United States Patent [19]

Hofrichter et al.

[11] Patent Number: 4,632,457
[45] Date of Patent: Dec. 30, 1986

[54] COLLAPSIBLE SEAT

[75] Inventors: James W. Hofrichter; Harold J. VanDuser, both of Reedsburg, Wis.

[73] Assignee: Seats Incorporated, Reedsburg, Wis.

[21] Appl. No.: 787,630

[22] Filed: Oct. 15, 1985

[51] Int. Cl.4 .............................................. A47C 1/02
[52] U.S. Cl. .................................... 297/335; 108/134; 248/240.1
[58] Field of Search ................ 297/335, 336; 108/134; 248/240, 240.1

[56] References Cited

U.S. PATENT DOCUMENTS 1,753,423  4/1930  Kroschel ........................... 248/240.1
1,842,954  1/1932  Anderson ............................. 248/240
3,730,107  5/1973  Bergkamp et al. ................ 248/240.1

FOREIGN PATENT DOCUMENTS 173614  1/1922  United Kingdom ................ 297/335

Primary Examiner—James T. McCall
Attorney, Agent, or Firm—Allegretti, Newitt, Witcoff & McAndrews, Ltd.

[57] ABSTRACT

A collapsible seat for use in industrial machinery cabs or commercial vehicles. The seat is secured at one end to a hinge attached to a vertical support member. The other end of the seat is supported by foldable arms, and a flexible tension member interconnects a lever arm adjacent the seat and the foldable arms. Rotation of the lever arm causes the foldable arms to fold and the seat to collapse against the vertical support member.

8 Claims, 6 Drawing Figures

COLLAPSIBLE SEAT

BACKGROUND OF THE INVENTION

This invention relates to an easily and safely collapsible seat. More specifically, this invention relates to such a collapsible seat for use, for example, on a cab for heavy industrial machinery or in commercial trucks.

A. PRIOR ART

For many years, collapsible seats have been used in a variety of ways. One such use is on cabs for heavy industrial machinery. For example, U.S. Pat. No. 2,565,695 ("the '695 patent") discloses a collapsible seat for intermittant use by engineers or motormen on the side of a locomotive cab. The seat of the '695 patent has foldable support arms on the underside of the seat. The seat is collapsed by reaching under the seat and manually applying pressure to the support arms to fold the arms and collapse the seat.

These types of collapsible seats have been very popular in the industry, yet their method of collapsing is relatively awkward and time consuming. They require the operator to reach well under the seat in order to fold the legs. Thus, the operator must not only exert substantial effort to collapse the rest, but must also place his or her hands (i) against the load-bearing, folding arms and (ii) in the path of the downwardly descending seat.

Another example of a collapsible seat in the prior art is shown in French Pat. No. 915.461 ("the French Patent"). The French Patent discloses a collapsible seat that is also supported by foldable arms. However, the arms are collapsed not by manually moving the arms, but rather by the operator's rotation of a handle on the underside of the seat immediately adjacent the free, rotating end of the seat. Rotation of the handle simultaneously moves another lever under the seat to force the support arms to fold, thus collapsing the seat.

The mechanism of the French patent is also somewhat difficult and unsafe to use. The trip lever is located under the seat, requiring the operator to place his or her hand in the path of travel for the seat when it collapses. In addition, the protruding trip handle is located in a position where it can be accidentally tripped by, or caught on, the operator, the operator's clothing, or objects past which the seat may pass when mounted on the side of an industrial machine or vehicle.

B. OBJECTS AND ADVANTAGES

It is thus an object of the present invention to develop a more easily operable, economical, simple, and safer collapsible seat, preferrably for use on heavy industrial machinery or commercial vehicles.

It is a further object to provide a collapsible seat that does not require the operator to place his or her hand in the direction of travel of the seat when collapsing.

Yet another object to provide a collapsible seat that is collapsed without the operator touching the folding support arms or any other load bearing members supporting the seat.

An additional object is to develop a collapsing mechanism that reduces the chances of (i) accidental collapsing, (ii) catching on objects passing by the machinery on which the seat is mounted, or (iii) impacting or pinching any portion of the operator or his or her clothing when the seat is in use, collapsing, or in a collapsed state.

Another object is to provide a collapsible seat that is rigidly and securely maintained as a seat and is yet quickly and easily collapsed by a single intentional and relatively effortless motion by an operator.

There are additional objects and advantages of the present invention. They will become apparent as the specification proceeds.

SUMMARY OF THE INVENTION

The foregoing and other objects and advantages are achieved by our invention of an improved collapsible seat. One end of the improved seat is attached by a rotatable connection to a support member. The other, seating end of the seat rotates about the rotatable connection to collapse the seat. A foldable support arm assembly unfolds from a folded state to support the seating end of the seat away from the support member. A puller is mounted at a distance from the support arm assembly, and a tensioning connector connects the support arm assembly to the puller. Pulling on the puller simultaneously pulls the tensioning connector which pulls and thus folds the support arm assembly past the point of providing rigid support for the seat. Preferably, the support arm assembly is then further collapsed by the downward force of gravity on the seat, without any additional operator effort or guidance.

BRIEF DESCRIPTION OF THE DRAWINGS

In the accompanying drawings, a first embodiment and a second embodiment of the the improved collapsible seat of the present invention are disclosed wherein.

DETAILED DESCRIPTION OF THE PREFERRED EMBODIMENT

Figure 1:
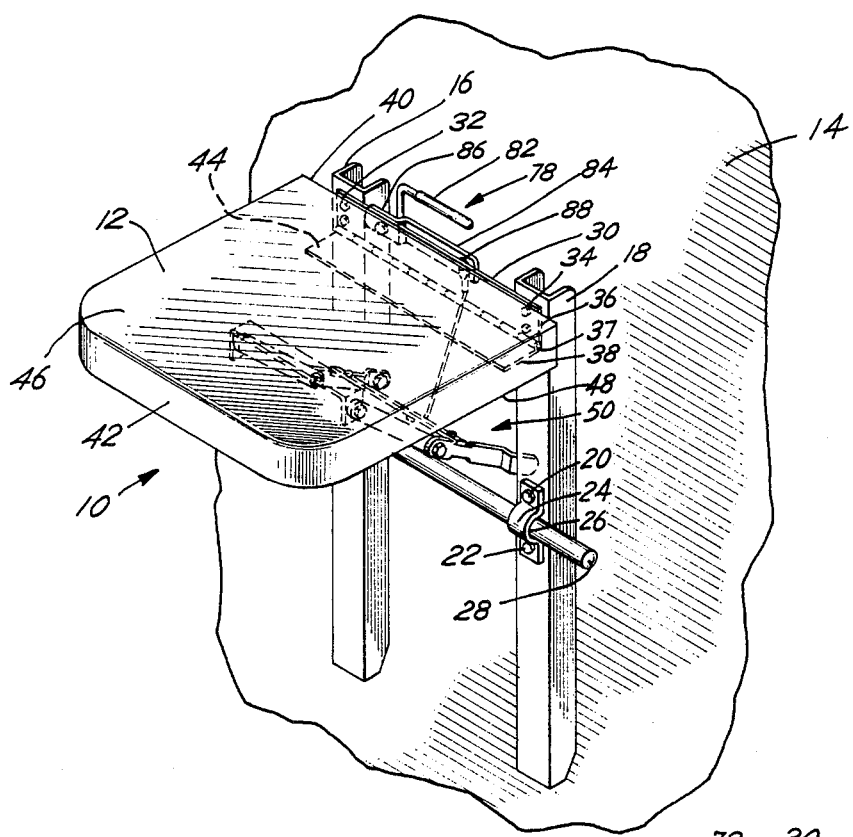
FIG. 1 is a perspective view of the first embodiment of the improved collapsible seat locked in position for use as a seat.
Figure 6:
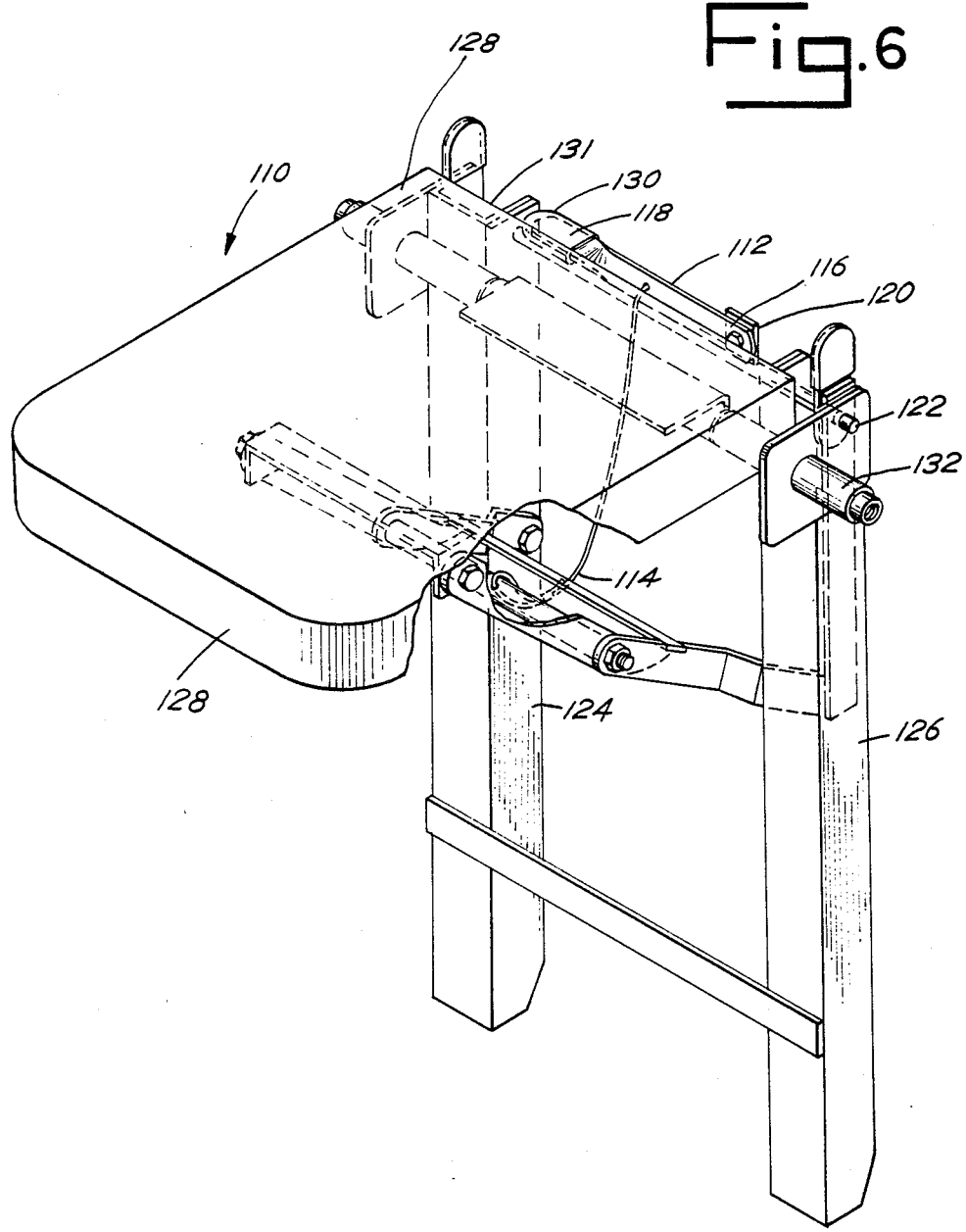
FIG. 6 is a perspective view of the second embodiment of the improved collapsible seat in position for use as a seat.

Referring to FIG. 1, the first preferred embodiment of the improved collapsible seat, generally 10, is designed to provide a rigidly supported seat portion 12 when the seat 10 is in its extended, locked position for use as a seating surface. In this position, the seating portion 12 extends horizontally from a supporting wall surface 14. It should be recognized that this particular embodiment of the collapsible seat 10 is only one of many designs of collapsible seats contemplated by the present invention. Another such design is shown in FIG. 6.

Referring again to FIG. 1, the collapsible seat 10 is supported on the wall surface 14 by two vertical, laterally spaced U-bar supports 16, 18. Each of the U-bar supports 16, 18 are secured to the wall surface 14 by two bolts 20, 22 (only shown in FIG. 1 for the one U-bar support 18). The two bolts 20, 22 also secure semicircular flanges 24 to each of the supports 16, 18, respectively. The flanges 24 as mounted on the supports 16, 18 each define a rod passage 26 (only shown in FIG. 1 for one U-bar support 18), and a horizontal rod 28 spans the distance between the supports 16, 18 to penetrate the rod passage 26 on each support 16, 18. A seat belt (not shown) may be secured to the horizontal rod 28 in any of a variety of ways well known in the art.

A transverse hinge 30 also spans the distance between the supports 16, 18 vertically above the rod 28 on the side of the supports 16, 18 opposite the wall surface 14. The hinge 30 is bolted at each end 32, 34 to the support members 16, 18 respectively. When the collapsible seat 10 is in its rigid, seating state (as in FIG. 1), the hinge 30 is L-shaped with the vertical portion 36 bolted to the support member 16, 18, and the horizontal portion 38 extending outwardly from the wall surface 14 and support members 16, 18 at the lowermost edge 37 of the vertical portion 36.

The seating portion 12 has a supported end 40, a seating end 42, a top, seating side 46, and a lower, underside 48. The underside 48 of the supported end 40 is affixed to the uppermost side 44 of the horizontal portion 38 of the hinge 30.

Figure 3:
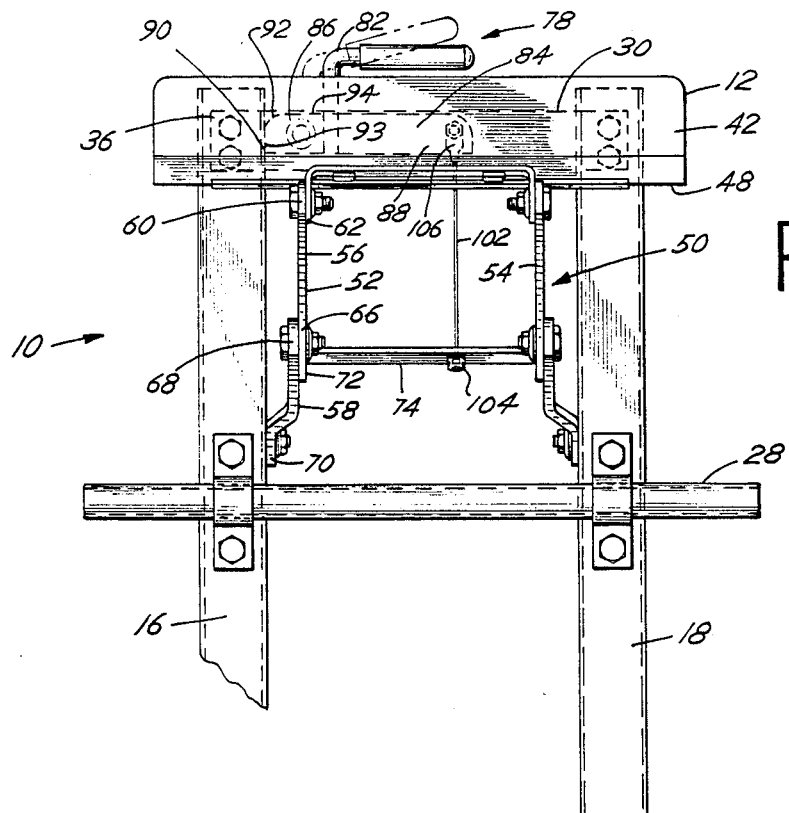
FIG. 3 is a front plan view of the first embodiment of the improved collapsible seat locked in position for use as a seat.

The seating end 42 of the seating portion 12 is supported horizontally outwardly from the wall surface 14 by a supporting arm assembly, generally 50. As shown in FIG. 3, the support arm assembly 50 consists of two sets of support brackets 52, 54. Each set of support brackets 52, 54 includes an upper arm 56 and a lower arm 58. The upper end 60 of the upper arm 56 is rotatably bolted to an underseat bracket 62, which is rigidly bolted to the underside 48 of the seat portion 12. The lower end 66 of the upper arm 56 is rotatably bolted to the upper end 68 of the lower arm 58, and the lower end 70 of the lower arm 58 is rotatably bolted to the U-bar, vertical support 16.

Figure 4:
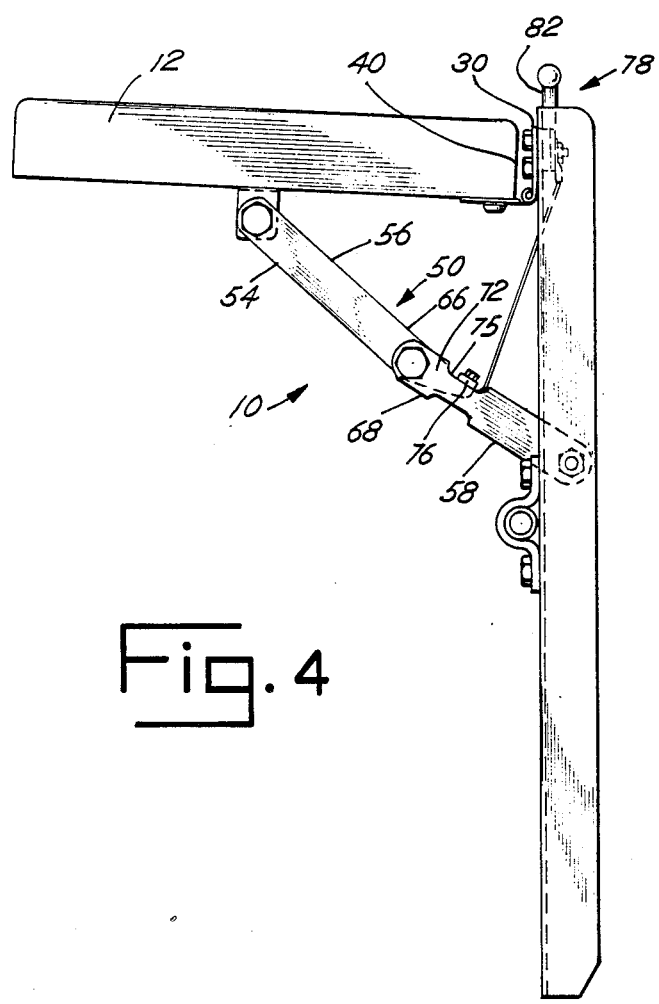
FIG. 4 is a left side plan view of the first embodiment of the improved collapsible seat locked in position for use as a seat.

As shown in FIG. 4, the lower end 66 of each upper arm 56 includes a projection section 72 extending beyond and below the lower end 66 of the upper arm 56. As shown in FIG. 3, a center bar 74 is welded at each end to the projection section 72 on each support bracket 52, 54. The center bar 74 thus horizontally spans the distance between the support brackets 52, 54.

Referring now to FIG. 4, adjacent the upper end 68 of each lower arm 58 is a detent 75 in the arm 58. Each projection section 72 includes a horizontally extending lip portion 76 that abuts the detent 75 when the support arm assembly 50 is in extended, seat supporting position. The upper 56 and lower 58 arms of the support brackets 52, 54 provide secure, locking support for the seating portion 12 when the arms 56, 58 are unfolded with respect to one another so that the lip portion 76 on each projection section 72 firmly abuts the detent 75 in each lower arm 58. In this manner, the lip portion 76 prevents the projection sections 72 from moving away from the seating portion 12 and thus folding the support brackets 52, 54 outwardly therefrom and collapsing the seat 10.

Figure 2:
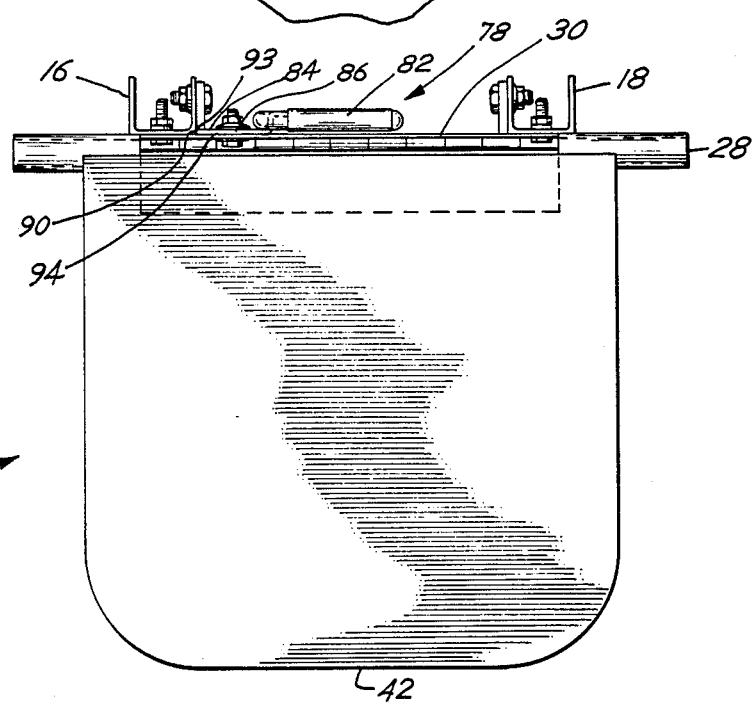
FIG. 2 is an elevational view of the first embodiment of the improved collapsible seat locked in position for use as a seat.

As shown in FIGS. 1, 2, and 3, a two-piece puller, generally 78, is rotatably secured to the horizontal, transverse hinge 30 on the side of the hinge opposite the supported end 40 of the seating portion 12. The two-piece puller 78 includes a tubular, L-shaped trip arm 82 welded to a horizontally extending, L-shaped lever arm 84. The lever arm 84 has a rotatable, secured end 86 and a lever end 88 laterally opposite the secured end 86. As shown in FIG. 3, the secured end 86 of the lever arm 84 has a partially planar surface 90 and a partially rounded surface 92 interconnecting the partially planar surface 90 and the planar upper edge 94 of the lever arm 84.

As shown in FIG. 2, the secured end 86 of the lever arm 84 is mounted adjacent a U-bar support arm 16 on the side of the hinge 30 opposite the seat portion 12. Thus, the partially planar surface 90 abuts the U-bar support 16 when the lever arm 84 is horizontal, and (not directly shown) the upper edge 94 of the lever arm 84 abuts the U-bar support 16 when the lever arm 84 is vertical. Thus, a small flat portion 93 of the support arm 16 thus provides a stop, preventing the lever arm 84 from rotating beyond the ninety degree range between a horizontal and vertical orientation of the rotatable lever arm 84.

Referring now to FIG. 3, a tensioning wire 102 is connected at one end 104 to the center bar 74 and at the opposite end 106 to the lever-arm end 88 of the lever arm 84. Thus, upward rotation of the trip arm 82 simultaneously rotates the lever arm 84 upward. In turn, the lever arm 84 pulls upward on the tensioning wire 102 and thereby on the center bar 74 to initiate folding of the support brackets 52, 54, simultaneously upwardly toward the seating portion 12 and the support arms 16, 18.

Figure 5:
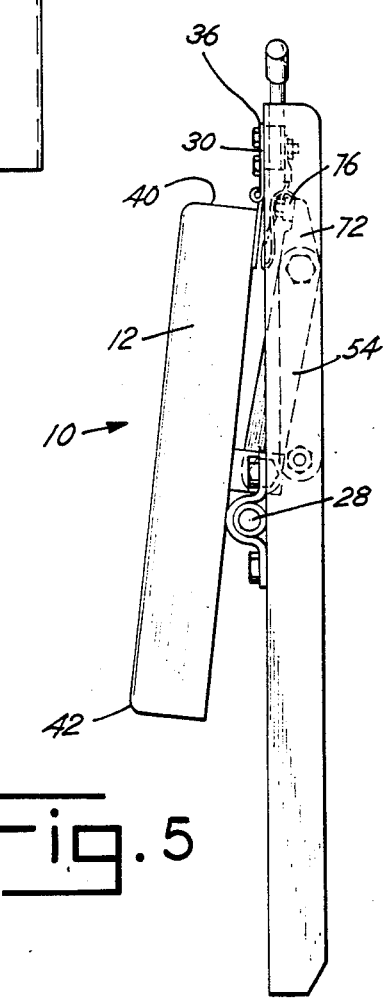
FIG. 5 is a left side plan view of the first embodiment of the improved collapsible seat in a fully collapsed state.

As shown in FIG. 3, the trip arm 82 need only be rotated a small amount to completely collapse the seat 10 as shown in FIG. 5. The lever arm 84 need only pull the center bar 74 upwardly so that the center bar 74 also moves slightly upward to initiate folding of the support brackets 52, 54 to a degree that they no longer provide locking, rigid support for the seating portion 12. At this point, no more operator effort is required to collapse the seat 10, as the pull of gravity on the seat portion 12 creates sufficient downward force on the seating end 42 of the seat portion 12 to fully fold the support brackets 52, 54. As the support brackets 52, 54 go from their supporting, locked position (as in FIGS. 1-4) to a fully folded position (as in FIG. 5), the seating portion 12 rotates about the hinge 30 to collapse the seat portion 12 to abut the horizontal rod 28 on the U-bar supports 16, 18 adjacent the wall surface 14.

The seat 10 is re-extended for use simply by pulling the seating end 42 of the seating portion 12 upwardly. This rotates the seating portion 12 upwardly with respect to the hinge 30 until the supported end 40 of the seating portion 12 abuts or nearly abuts the vertical, fixed portion 36 of the hinge 30. In this position, the bracket arms 52, 54 are fully unfolded. Releasing the seating end 42 of the seat portion 12 allows the bracket arms 52, 54 to return to a rigid, locked state (as in FIGS. 1-4) with the lips 76 on the projection sections 72 once again firmly abutting the detents 75 in the support brackets 52, 54.

Referring now to FIG. 6, an alternative embodiment of the improved seat, generally 110, utilizes a one-piece puller 112 and a tensioning chord 114 that allows significant slack until tensioned by the one-piece puller 112. The slack in the tensioning chord 114 helps prevent accidentally collapsing the seat 110 when the one-piece puller 112 is accidentally rotated.

The one-piece puller 112 has a planar, fixed end 116 opposite, and at ninety degrees to a planar, free end 118. The fixed end 116 is rotatably secured to a vertical bracket 120 extending vertically upwardly from horizontal bar 122 spanning between the vertical seat supports 124, 126. Thus, the vertical bracket 120 extends upwardly above the level of the seating surface 128 and adjacent the end of the seating surface 128 nearest the seat supports 124, 126.

The free planar end 118 has a plastic cover 130. The plastic cover 130 provides a readily identifiable surface for the operator to grip, or place several fingers under the free end 118 and rotate it upwardly about the fixed, rotatable end 116.

The alternative embodiment 110 also has a seating portion 128 rigidly affixed at an affixed end 131 to a rotatable, horizontal support bar 132 spanning between and beyond the seat supports 124, 126. The seating portion 128 is thus rotatable about its affixed end 130 to collapse the seat 110 in the direction of the seat supports 124, 126. Seat belts (not shown) are preferably attached to the horizontal support bar 132.

The collapsible seats disclosed herein provide easily and quickly operable, economical, simple, and safe collapsible seats. The operator need never place his or her hand under either of the seats or in the path of downward travel while collapsing either of the the seats. Furthermore, for either seat, the operator's hands need never be in the vicinity of a load bearing surface either during collapsing or unfolding and assembly of the seat. At all times, the foldable, rotatable components are out of the way of the operator, the operator's clothing, and the location of fixed objects past which either seat might move. Moreover, each of the seats is rigidly and securely maintained as a seat when in use while at the same time being easily collapsible by a single intentional and relatively effortless motion at a point conveniently located near the wall surface and above the seating surface.

While in the foregoing there has been a detailed description of the preferred embodiment of the present invention, it should be understood that the scope of the invention is not so limited. All equivalent collapsible seats are included within the scope of the invention claimed.

What is claimed is:

1. An improved collapsible seat comprising in combination:
   (a) a seating portion having a first and a second end;
   (b) means for supporting the seating portion;
   (c) means for rotatably connecting the first end of the seating portion to the seat supporting means;
   (d) a support arm assembly providing means for collapsibly interconnecting the seating portion and seat support means, the assembly including a first foldable brace, a second foldable brace, and a center bar interconnecting the first and second foldable braces, each foldable brace having a fit arm rotatably connected at one end to the seating portion and a second arm rotatably connected to the support means, the first arm also being rotatably secured to the second arm, the center bar having a first end opposite a second end, the first end being cooperative with the first foldable brace to limit movement of the first brace outwardly from the seat supporting means, and the second end being cooperative with the second foldable brace to limit movement of the second brace outwardly from the supporting means;
   (e) a puller mounted at a distance from the center bar on the support arm assembly; and
   (f) a flexible, tensioning member connecting the puller to the center bar whereby when the operator pulls the puller, the tensioning member moves the center bar to fold the foldable members and allow the second end of the seating portion to rotate with respect to the seat supporting means.

2. The improved collapsible seat of claim 1 wherein:
   (i) the puller includes a trip arm extending from a lever arm, the lever arm being secured to the tensioning member and rotatably attached at one end to the seat supporting means adjacent the first end of the seating portion, and
   (ii) the tensioning member is connected at one end to the lever arm on the puller and at the opposite end to the foldable support arm assembly.

3. The improved collapsible seat of claim 2 wherein:
   (i) the seat supporting means includes a stop member adjacent the first end of the seating portion;
   (ii) the lever arm is rotatably mounted adjacent the member; and
   (iii) the stop member provides means for preventing the lever arm from rotating past a predetermined point with respect to the seat supporting means.

4. The improved collapsible seat of claim 1 wherein:
   (i) the seat supporting means includes a stop member adjacent the first end of the seating portion;
   (ii) the puller has a first planar end opposite, and perpendicular to, a second planar end rotatably mounted adjacent the stop member; and
   (iii) the stop member provides means for preventing the puller from rotating past a predetermined point with respect to the seat supporting means.

5. An improved collapsible seat comprising in combination:
   (a) a seating portion having a first end, a second end laterally opposite the first end, a bottom side, and a seating side opposite the bottom side;
   (b) at least one upwardly extending means for supporting the seat portion;
   (c) a rotatable member rotatably connecting the first end of the seating portion to the support member;
   (d) a support arm assembly interconnecting the bottom side of the seating portion to the support means, the assembly including a first and a second foldable support brace and a center bar, each foldable support brace including an upper and lower arm, each arm having an upper and a lower end, the upper end of each upper arm being rotatably attached to the bottom side of the seating portion, the lower end of each upper arm being rotatably attached to the upper end of the respective lower arm, the lower end of each lower arm being rotatably attached to the support means, the center arm interconnecting the first and second foldable support braces, the center bar having a first end opposite a second end, the first end being cooperative with the first foldable brace to limit movement of the first brace outwardly from the seat supporting means, and the second end being cooperative with the second foldable brace to limit movement of the second brace outwardly from the supporting means;
   (e) a puller rotatably secured to the support means, the puller including a lever arm rotatably attached at one end to the support means and a trip arm extending from the lever arm whereby rotation of the trip arm simultaneously rotates the lever arm;
   (f) a lever arm stop on the support member to prevent rotational movement of the lever arm past a first predetermined point with respect to the support means; and (g) a flexible, tensionable member having a first end connected to the lever arm and a second end connected to the center bar on the support arm assembly, whereby rotation of the trip arm rotates the lever arm to tension the flexible member and thus pull the center bar toward the puller, thereby folding the foldable braces to allow the seat to collapse by rotating the second end of the seating portion toward the support means.

6. The improved collapsible seat of claim 5 wherein the puller is mounted adjacent the first end of the seating portion.

7. The improved collapsible seat of claim 5 or 6 wherein the lever arm stop comprises a vertical supporting bracket adjacent the rotatably mounted end of the lever arm of the puller and the rotatably mounted end of the lever arm is partially rounded and partially planar so that (i) rotation of the lever arm in one direction causes the planar portion to abut the vertical supporting bracket prevent rotational movement past the first predetermined point, and (ii) rotation of the lever arm in the opposite direction causes the lever arm to abut the vertical supporting bracket to prevent rotational movement past a second predetermined point with respect to the support means.

8. An improved collapsible seat comprising in combination:

(a) a seating portion having a first end, a second end laterally opposite the first end, a bottom side, and a seating side opposite the bottom side;

(b) at least one upwardly extending means for supporting the seat portion;

(c) a rotatable member rotatably connecting the first end of the seating portion to the support member;

(d) a support arm assembly interconnecting the bottom side of the seating portion to the support means, the assembly including a first and a second foldable support brace and a center bar, each foldable support brace including an upper and lower arm, each arm having an upper and a lower end, the upper end of each upper arm being rotatably attached to the bottom side of the seating portion, the lower end of each upper arm being rotatably attached to the upper end of the respective lower arm, the lower end of each lower arm being rotatably attached to the support means, and the center arm interconnecting the first and second foldable support braces, the center bar having a first end opposite a second end, the first end being cooperating with the first foldable brace to limit movement of the first brace outwardly from the seat supporting means, and the second end being cooperative with the second foldable brace to limit movement of the second brace outwardly from the supporting means;

(e) a puller having a first planar end opposite, and perpendicular to, a second planar end, the first end being rotatably secured to the support means adjacent the first end of the seating portion;

(f) a puller stop mounted on the support means to prevent the puller from rotating past a first predetermined point with respect to the support means; and (g) a flexible, tensionable member having a first end connected to the puller and a second end connected to the center bar on the support arm assembly, whereby rotation of the second planar end of puller tensions the flexible member and thus pulls the center bar toward the puller, thereby folding the foldable braces to allow the seat to collapse by rotating the second end of the seating portion toward the suppport means.

* * * * *